PHILIP THORPE PRIESTLEY
WALTER SIDNEY SEBBORNE
RAYMOND FRANK WILLIAM SELMAN
INVENTORS

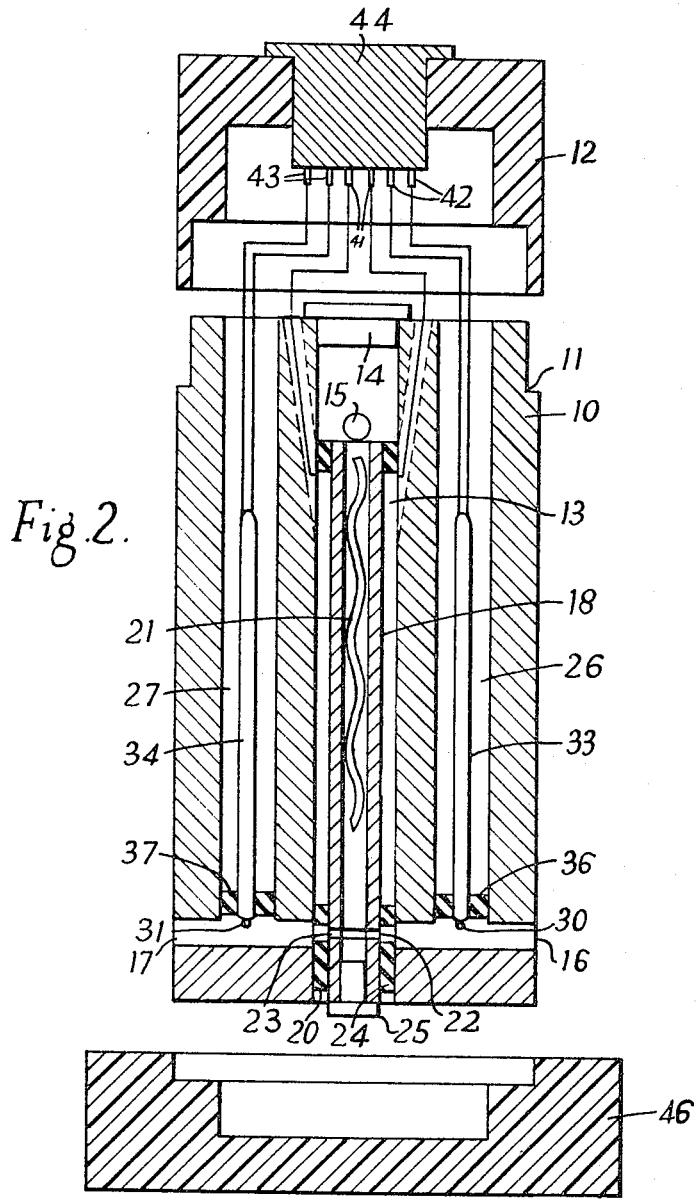

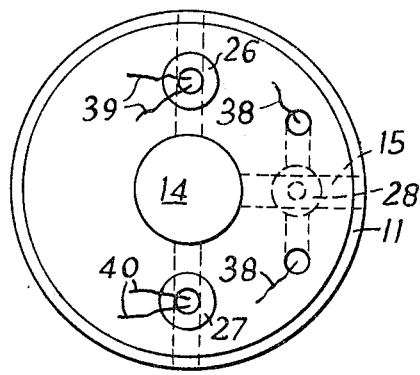
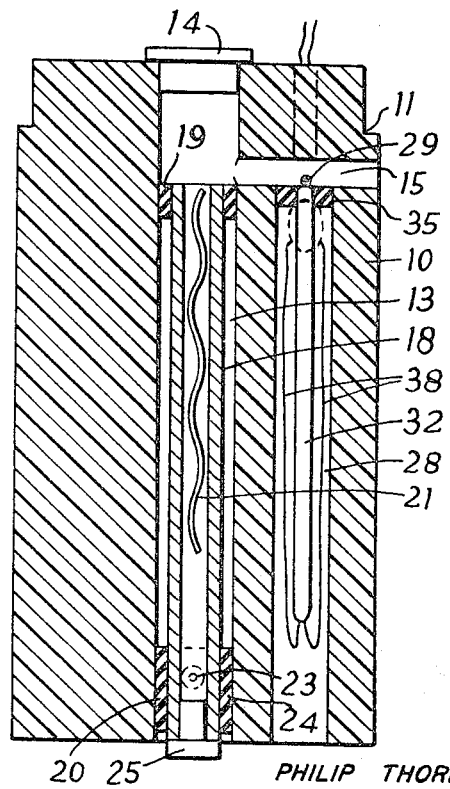

United States Patent Office 3,436,190
Patented Apr. 1, 1969

3,436,190
DEVICE FOR THE DETERMINATION OF THE CONCENTRATION OF A CHEMICAL COMPOUND IN A LIQUID
Philip Thorpe Priestley, Walter Sidney Sebborn, and Raymond Frank William Selman, Harrow, Middlesex, England, assignors to Eastman Kodak Company, Rochester, N.Y., a corporation of New Jersey
Filed Jan. 13, 1965, Ser. No. 425,161
Claims priority, application Great Britain, Jan. 17, 1964, 2,171/64
Int. Cl. G01n 33/00
U.S. Cl. 23—253     3 Claims

ABSTRACT OF THE DISCLOSURE

A process and apparatus adapted for continuously measuring and indicating by thermometric analysis, the concentration of a compound dissolved in a continuously flowing liquid. The liquid containing the dissolved compound is continuously contacted with a liquid containing a reagent in stoichiometric excess. The temperature of these liquids before mixing is continuously measured. The liquids are then permitted to react and the temperature of the then thoroughly-reacted flowing liquids is continuously measured again. The resulting calorific change is proportional to the concentration of the reaction product formed and thus indicates the concentration of the compound.

---

This invention relates to a method of determining the concentration of a chemical compound in a liquid.

In many methods of determining the concentration of a chemical compound in a liquid, for example water, samples of the solution are taken and each one is tested separately and an average result recorded. To get more precise results more samples are taken and tested which is very time consuming. In the volumetric analysis of solutions of chemical compounds graduated vessels are employed and the accuracy of the graduations affects the accuracy of the results. Many methods of concentration determination in respect of chemical compounds in solution also require the use of relatively large amounts of the solution. In many cases in order to obtain results with the testing materials and apparatus of the size available, dilution or concentration of the sample must be resorted to.

It is apparent therefore that an improved method of determining the concentration of a chemical compound in a liquid is highly desirable.

A principal object of the present invention is to provide a rapid method of precisely determining the concentration of a chemical compound in a liquid.

Another object of the invention is to provide apparatus for determining the concentration of a chemical compound in a liquid which does not require the use of graduated vessels for the liquid.

A further object of the invention is to provide a method of determining the concentration of a chemical compound in a liquid which requires only a small quantity of the liquid.

Still another object of the invention is to provide a method of determining the concentration of a chemical compound in a liquid which is applicable to measuring concentrations over a very wide range.

These and other objects are attained by providing according to this invention a method of determining the concentration of a chemical compound in a liquid which, broadly described, comprises forming from the liquid and from a reagent with which said compound reacts exothermically or endothermically a stream of liquid containing said chemical compound and said reagent in stoichiometric excess and having a constant heat capacity per mole of said chemical compound, thoroughly mixing said compound and reagent in said stream, measuring the difference in the temperatures of the stream at a point where said chemical compound and said reagent have not reacted and at a point where some or all of said chemical compound has reacted with said reagent and determining the concentration of said chemical compound from the said difference in temperatures.

It will be noted that in the method of this invention in its broadest sense, the stream as first formed contains the chemical compound and the reagent and that the heat capacity of the stream per mole of chemical compound is maintained constant while carrying out the method.

By this term "heat capacity per mole of chemical compound" we mean the heat capacity of a given volume of the stream divided by the number of moles of the compound in that volume of stream.

It is possible to maintain the heat capacity of the stream per mole of chemical compound at a constant value although the molar concentration of the compound in the original liquid is as yet unknown so long as the concentration of the chemical compound in the liquid being tested remains constant for a sufficient period. Provided this condition is satisfied the heat capacity of the stream per mole of compound can be maintained constant by uniting the liquid containing the chemical compound and the reagent in constant ratio by volume.

In actual practice if the liquid containing the chemical compound and the reagent are united in constant ratio by volume, the temperature difference will become steady after a short period if the concentration of the chemical compound in the original liquid remains constant for that period. Thus, in addition to being useful for analysing discrete solutions of a chemical compound the method of the present invention is also useful for analysing solutions produced continuously provided the concentration of the compound in the solution remains substantially constant for a period long enough for the temperature difference to become steady.

The method of the invention may be used either with reagents that react exothermally with the compound, in which case a temperature rise occurs in the united single stream or with reagents that react endothermally with the compound, in which case a temperature drop occurs in the single stream.

It will be understood that either no heat must be lost from the united stream during the reaction (assuming the reaction to be exothermic) or, alternatively that if heat is lost a correction is made. Heat may be lost by conduction, convection and radiation. Such loss can be reduced to negligible amounts by maintaining the tube through which the united stream is passed at the average temperature of the united stream. This temperature can be conveniently established by passing the united stream through an insulated tube until the heat evolved heats up the tube to an equilibrium temperature.

In the preferred method of the present invention the stream of liquid containing the chemical compound and the reagent in stoichiometric excess is formed by uniting an aqueous solution of the compound and an aqueous solution of the reagent in constant ratio by volume and the difference in temperatures from which the concentration of the compound is determined is ascertained by measuring the temperatures of the solutions just before they are united and calculating therefrom the temperature of the united stream as first formed and by measuring the temperature of the united stream when the reaction which takes place therein between the compound and the reagent is substantially complete.

In this preferred method the temperatures are preferably measured by means of thermistors included in a bridge circuit arranged to give direct readings of the molar concentration of the chemical compound.

To ensure thorough mixing, the two solutions may be united by passing them through diametrically opposed capillary ports in one end of a cylindrical tube along which the united stream then flows; this tube is preferably provided with a mixing baffle. Tubes, pipes or other conduits for conducting the liquids may be used, and other methods of mixing.

Some equations will now be given applicable to the preferred method of the invention where the specific heats and densities of the liquid media are both 1, which may be assumed to be the case for aqueous solutions:

|  | Compound + | Reagent → | Product |
|---|---|---|---|
| Molar concentrations | $M_s$[1] | $M_r$[2] | $M_s$[3] |
| Simultaneous temperatures | $T_s$ | $T_r$ | $T_p$ |
| Flow rates in ml./sec. | $x$ | $R \cdot x$ | $x \cdot (1+R)$ |
| Flow rates in mole/sec. | $x \cdot M_s/1{,}000$ | $<R \cdot x \cdot M_r/1{,}000$ | $x \cdot M_s/1{,}000$ |
| Heat of reaction in kilocal/mole | | | H |

[1] In original stream $s$.
[2] In original stream $r$.
[3] In united stream.

Heat entering the system (cal./sec.) due to unreacted reactants $= x.T_s + R.x.T_r$ Heat entering the system (cal./sec.) due to the reaction $= x.M_s.H$ Heat leaving the system (cal./sec.) by way of product $= x.(1+R).T_p$ When the equilibrium is reached the net change of heat is zero and $$x.T_s + R.x.T_r + x.M_s.H = x.(1+R).T_p$$

$$M_s.H = T_p.(1+R) - T_s - R.T_r \qquad (1)$$

Thus it will be seen that, for a given reaction (H constant), the molarity of the compound ($M_s$) is a linear function of the three temperatures $T_s$, $T_r$ and $T_p$ and also of the parameter R which is the ratio of the flow rates of reagent to compound. It should be noted that the actual flow rates are unimportant so long as the ratio R remains constant; under practical conditions, however, rapid fluctuations in flow rates must be avoided if equilibrium is to be attained. It will also be seen from Equation 1 that heats of reaction (H) may be determined by suitable application of the method.

If the flow rates of the reactant solutions are equal (in volume/second) Equation 1 simplifies to:

$$M_s H = 2T_p - (T_s T_r) \qquad (2)$$

In this case the temperature difference between that of the product solution and the average temperature of the compound and reagent solutions is equal to $M_s.H/2$ and is thus proportional to the molarity of the sample.

The preceding theory, leading up to the formulation of Equation 1, assumes that equilibrium is in fact reached and gives no indication of the time taken to reach equilibrium after the reactants are initially brought into contact. Thus the instantaneous net change of heat (cal./sec.) is not zero and is equal to:

$$x.T_s + R.x.T_r + x.M_s.H - x.(1+R).T_p \neq 0$$

If V is the total heat capacity of the system (cal./° C.), then the rate of temperature change is given by:

$$\frac{dT_p}{dt} \text{(deg./sec.)} = \frac{x(1+R)}{V}\left[\frac{T_s}{1+R} + \frac{R \cdot T_r}{1+R} - T_p\right] + x \cdot M_s \cdot H$$

the solution to which is:

$$\frac{dT_p}{dt} = \alpha \cdot e^{-\beta \cdot t} \qquad (3)$$

where $\alpha$ and $\beta$ are constants.

Thus the rate of change of temperature $T_p$ falls-off as the reaction proceeds until it is zero at equilibrium, at infinite time.

In fact $$\beta = x.(1+R)/V \qquad (4)$$

and as would be expected this shows that equilibrium is more quickly attained with low values of V and high rates of throughput $(x+R.x)$ although it will be shown later that practical considerations affect the choice of these parameters.

In the particularly preferred form of the present invention the temperatures $T_s$, $T_r$ and $T_p$ are measured by three thermistors in a simple bridge circuit arranged to evaluate $2T_p - (T_s + T_r)$ continuously.

As has been shown above, this temperature difference is equal to $M_s.H$.

The resistance of a thermistor R is an exponential function of temperature T according to the law $$R = \alpha.e^{b/T} \qquad (5)$$

If a resistance S is placed in parallel with the thermistor then there will be a point of inflexion somewhere in the curve of $RS/R+S$ versus T, where for a range of temperature the combination obeys a linear law.

It can be shown that if $R_o$ is the resistance of the thermistor at $T_o$ (the temperature at the point of inflexion) then the value of S for the greatest linearity is given by $$S = \frac{b - 2T_o}{b + 2T_o} \cdot R_o \qquad (6)$$

where $b$ is the thermistor parameter in Equation 5.

It follows that if C represents the resistance of the combination $RS/R+S$, then, $$\frac{dC}{dT} = \frac{-R_o(b - 2T_o)^2}{4bT_o^2} \qquad (7)$$

$$= \text{a constant}$$

which is the condition required.

One form of bridge circuit incorporating shunted thermistors for measuring the temperatures of the solution of the compound, the solution of the reagent and the united stream after reaction in the method of the present invention is shown in FIG. 1.

Referring to the circuit shown in FIG. 1, a source of current F' at voltage V' comprising a battery X in series with a resistance of value $R_3$ is connected across a bridge B' having parallel resistances of values P' and Q' respectively. In the other arms of the bridge B' in series with resistances P' and Q' respectively are the resistances $C_p'$ (in series with P') and $C_r'$ and $C_s'$ (both in series with Q'). These resistances $C_p'$, $C_r'$ and $C_s'$ are combinations of thermistors of resistances $R_p'$, $R_r'$ and $R_s'$ respectively in parallel with shunts of resistances $S_p'$, $S_r'$ and $S_s'$ respectively, the values of the shunt resistance being in accordance with Equation 7 above.

The bridge B' also comprises a balance potentiometer K in series between the resistance Q' and the resistances $C_1'$ and $C_s'$ and, in series between the resistances P' and $C_p'$, two potentiometers in parallel namely, a sensitivity potentiometer H and a molarity potentiometer M which is fed by the voltage from H. The galvanometer arm of the bridge B' comprises a direct scale galvanometer of resistance G connected across a condenser $C_1$ and a resistance of value $R_1$. One terminal of the galvanometer is directly connected to the slide of the balance potentiometer K and the other is connected through the resistance $R_1$ to the slide of the molarity potentiometer M.

The molarity potentiometer M is fitted with a "Digidial" D. This dial has 1,000 digits which indicate the position of the slide on the potentiometer M. In practice it may be convenient to adjust the voltage from the potentiometer H so that each digit on the dial corresponds exactly to 1 millimole. The sensitivity potentiometer H may, if desired, be calibrated in units of kilocalories.

The apparatus shown in FIG. 1 also includes switch $S_1$ which may be closed to connect the source of current $F'$ to bridge $B'$, and a switch $S_2$ by means of which the voltage from the potentiometer H applied to the potentiometer M can be reversed whereby both exothermic and endothermic reactions may be studied, the slides of the molarity potentiometer being moved in the same direction for both reactions. The apparatus also includes a switch PB1 by means of which the bridge voltage $V'$ can be applied to the galvanometer through the resistance $R_1$ in order to test the battery.

To set up the apparatus shown in FIG. 1 for the measurement of the concentration of a compound in an aqueous solution according to the present invention, the thermistors of resistances $R_p'$, $R_r'$ and $R_s'$ are calibrated at three temperatures, e.g. 15° C., 20° C. ($T_0$, the temperature of the point of inflexion) 25° C. and the parameters $b$ and $S$ for Equation 7 are evaluated.

The three combinations of thermistor and shunt of total resistances $C_p'$, $C_r'$ and $C_s'$ respectively are then prepared. The value of $P'$ is made equal to the preferred value which is about 100 times that of $C_p'$. This gives a value for the current $I'$ of about 0.6 μa. The value of $Q'$ is then determined by trial.

A preferred form of reaction vessel which may be used with the electrical apparatus described with reference to FIG. 1 will now be described by way of Example with reference to FIGS. 2, 3, and 4 in which:

FIG. 2 is a vertical section of the container,

FIG. 3 is another vertical section of the container at right angles to that of FIG. 2, and FIG. 4 is a plan view of the apparatus.

Figure 1:
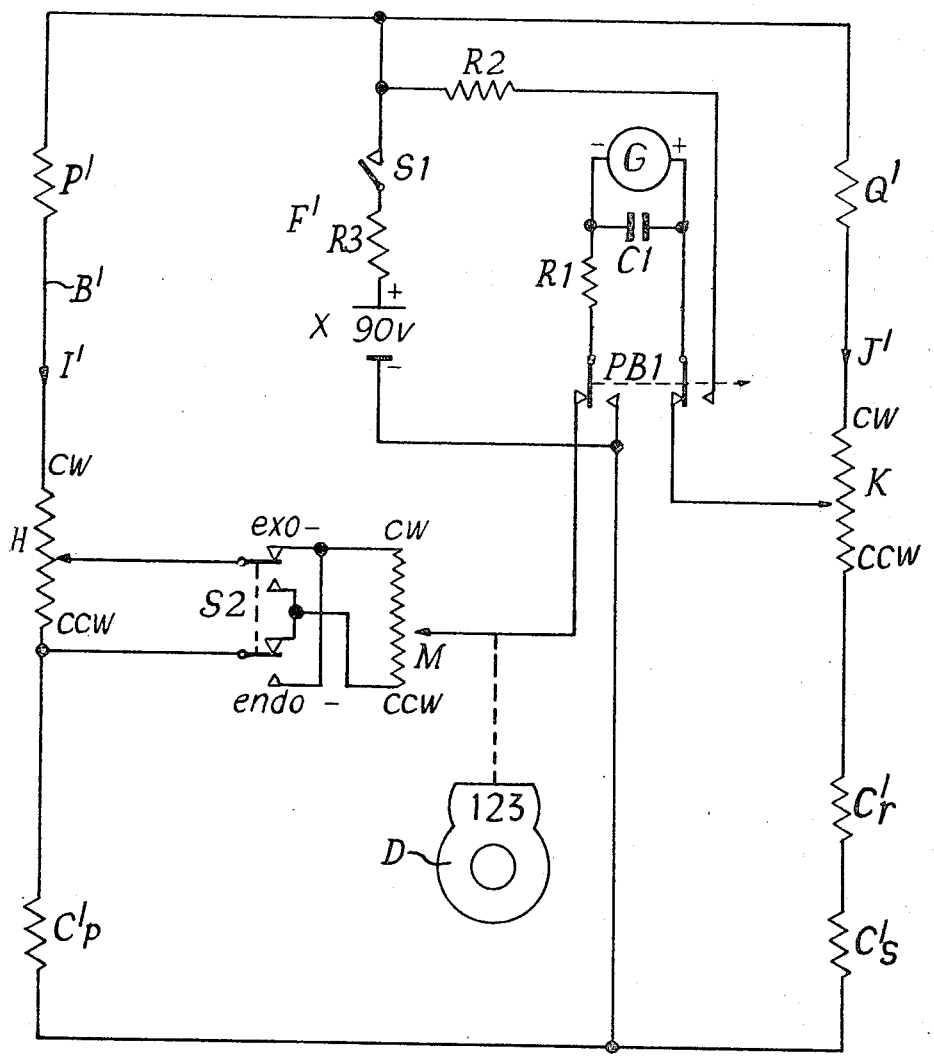

Referring to these figures an upright cylindrical body 10 of plastic material is rebated at 11 near the upper end of the body 10 to take a cap 12. The body 10 has an axial bore 13 which is plugged at the upper end by a plug 14 and which leads into a radial bore 15 near the upper end of the body 10. Leading into the lower portion of the axial bore 13 are two further radial bores 16 and 17. The axial bore 13 contains a mixing tube 18 which extends from below the points of entry of the lower radial bores 16 and 17 to below the radial bore 15 and is held in position in the bore 13 by plugs 19 and 20. The mixing tube 18 contains a mixing baffle 21 and has diametrically opposed ports 22 and 23 which connect the interior of the tube 18 with the lower radial bores 16 and 17 respectively. The bore 13 and the tube 18 are plugged at their lower ends by plugs 24 and 25 respectively. The diameter of the mixing tube 18 is such that an insulating annular air space is formed between the tube 18 and the walls of the bore 13. The body 10 also has bores 26 and 27 parallel to bore 13 and extending down from the upper end of the body 10 and into the radial bores 16 and 17 respectively.

A further bore 28 parallel to the axial bore 13 extends from the radial bore 15 down to the base of the cylindrical body 10. Thermistors 29, 30 and 31 are fixed in the radial bores 15, 16 and 17 being mounted on supporting stems 32, 33 and 34 which are plugged into axial bores 28, 26 and 27 respectively, by plugs 35, 36 and 37 respectively. The stems 32, 33 and 34 also carry the pairs of wires 38, 39 and 40 connecting the thermistors 29, 30 and 31 to pairs of terminals 41, 42 and 43 provided in the 6-way socket 44 mounted in the cap 43. 46 is a support. The reaction vessels of FIGS. 2 to 4 is preferably constructed of materials of low heat capacity, e.g. polymers such as polyethylene and polymethylmethacrylate. The mixing baffle 21, may be made of polyethylene tape; it serves also to reduce "noise" and to improve the detection of the balance point. The plugs 19, 20, 35, 36 and 37 may consist of rubber tubing. A peristaltic pump is preferably used to pump the liquids through the apparatus.

To use the apparatus of FIGS. 1 to 4 for determining the concentration of a chemical compound in an aqueous solution, thermistors 29, 30 and 31 are connected to the electrical apparatus of FIG. 1 of which they form resistances $R_p'$, $R_s'$ and $R_r'$ respectively. Distilled water is first pumped through radial bore 16 and an aqueous solution of the reagent at suitable concentration through radial bore 17. The liquids then pass through capillary ports 22 and 23 respectively, into mixing tube 18 where they are completely mixed by baffle 21 and out through radial bore 15. Under steady conditions the galvanometer G is zeroed using potentiometer K thus eliminating the effect of the heat of dilution of the reagent. Then an aqueous solution of the compound at a higher known concentration than the unknown solution is substituted for the distilled water and the "Digidial" D set to indicate this concentration; the galvanometer G is then zeroed using potentiometer H. The unknown solution of the compound is then substituted for the standard solution and the molarity thereof read on the "Digidial" D.

The dimensions of the apparatus described in relation to FIGS. 2, 3 and 4 may be, for example, as follows:

| Body 10: | Inches |
|---|---|
| Diameter | 1.5 |
| Height | 4.5 |
| Bore 13, diameter | 0.28 |
| Bores 26, 27 and 28, diameter | 0.25 |
| Bores 15, 16 and 17, diameter | 0.156 |
| Mixing tube 18: | |
| Diameter | 0.125 |
| Wall thickness | 0,031 |
| Length (total) | 3.75 |
| Ports 22 and 23, diameter | 0.016 |

The ports 22 and 23 may be positioned 3.25″ from the upper end of the mixing tube 18.

| Cap 12: | Inches |
|---|---|
| Diameter | 1.5 |
| Length | 2.0 |
| Base 46: | |
| Diameter | 3.0 |
| Height | 1.125 |

Examples of aqueous solutions which can be analysed by the method of the present invention, for example using the apparatus described with reference to and as shown in FIGS. 1 to 4 are as follows:

| Reagent Compound | Sample Compound | Concentration range of sample compound |
|---|---|---|
| 0.6 M NaOH | HCl | 0–500 |
|  | Tartaric Acid | 0–200 |
| 0.6 M HCl | Pyridine | 0–400 |
|  | $Na_3PO_4$ | 0–200 |
|  | NaOH | 0–500 |
|  | $Na_2CO_3$ | 0–100 |
|  | $Na_2SO_3$ | 0–200 |
| M $Na_4$ E.D.T.A | $BaCl_2$ | 0–700 |
|  | $CuSO_4$ | 0–600 |
|  | $MgSO_4$ | 0–800 |
| 0.2 M $AgNO_3$ | NaCl | 0–100 |
| 0.2 M NaCl | $AgNO_3$ | 0–100 |
| 0.5 M $Na_2S_2O_3$ | $KI_3$ | 0–400 |

In the above table the concentrations are in millimoles per litre.

Using the apparatus of FIGS. 1 to 2, results of a high order of precision can be obtained with good reproducibility. A reproducible result can be obtained using only a total of only 10 ml. of solution of the compound. The sensitivity control is adapted to a very wide range of concentration levels, e.g. a range of digits 0–1000 may cover any desired range from 0–0.01 molar to 0–0.1 molar in an acid/base system. Low concentrations of the compound can be satisfactorily analysed by the method of the invention. Low concentrations—obtainable by dilution—are preferred if there is a danger of precipitates clogging the apparatus or of improper mixing.

The method and apparatus described in the foregoing with reference to FIGS. 1 and 2 may be modified in various ways. For example, if the temperature of these two solutions are equalised before mixing them; in this case $$M_sH = 2(T_p - T_s) \qquad (8)$$

and only two thermistors are required.

An alternative simplification results if the reagent flow rate is made much smaller than the compound flow rate. In this case Equation 1 approximates to:

$$M_sH=T_p-T_s \qquad (9)$$

When the reagent flow rate is much smaller than the compound flow rate, the volume of reagent solution being introduced into the reaction will be much less than the volume of the corresponding compound solution. Thus, since we require the reagent to be in stoichiometric excess when it reacts with the compound, it must necessarily be of a much higher molar concentration than that of the compound solution.

In this case it is evident that $T_r$ has little effect, dilution of the compound solution is negligible and consequently the maximum possible temperature change is achieved. The solubility of the reagent and product limits the application of this principle for high values of compound concentration (i.e. greater than about 0.1 M) but may be used to advantage to double the sensitivity when measuring very dilute solutions of the compound.

A further alternative is to make the reagent flow rate very much greater than the compound, in which case Equation 1 approximates to:

$$M_sH=R(T_p-T_r) \qquad (11)$$

In this case $T_s$ has little effect but there is considerable dilution of the compound and consequently the temperature difference is much reduced. Nevertheless, this method is suitable for concentrated solutions of the compound.

With suitable instrumentation the method of the present invention may be carried out using only one thermometer. This form of the present invention may be implemented by alternating the flow of each or either of the reactants with that of the product past the thermometer and the desired result obtained by the use of electronic apparatus. Alternatively, the actual thermometer or parts of the apparatus may be moved mechanically in order to measure the required temperatures. Some of the electronic methods which may be used include memory circuits, for addition and subtraction of temperatures, and both oscillographic and digital readout of results.

In some cases sufficiently accurate results are obtained if the temperature of the united stream is measured before the reaction between the compound and the reagent is substantially complete.

Methods of alternaing the flow which may be used include the use of valves or drop-wise addition of reactants to a continuous stream of solution.

In the case of very rapid reactions the united stream can be allowed to fall smoothly through an inert atmosphere at the average temperature of the stream and the temperature after reaction measured at some point in the fall of the stream.

It is apparent, therefore, that we have provided a method of determining the concentration of a chemical compound in a liquid which avoids repeated analyses, each determination being equivalent to many separate prior art titrations, and which at the same time requires the use of only small quantities of solution of the compound.

The method and apparatus we have provided can be used to determine a wide range of concentrations of compounds and does not depend on the use of graduated vessels.

If the concentration of the chemical compound is known any of the methods and apparatus described in the foregoing can be used to determine the other parameters of Equation 1 from the measured temperatures.

Various other changes and modifications, which will be apparent to those skilled in the art, may be made in the methods of the invention and in the apparatus for use therein described in the foregoing without departing from the spirit of the invention or from the scope of the appended claims.

Having now particularly described our invention, what we desire to secure by Letters Patent of the United States and what we claim is:

1. Apparatus for continuously determining the concentration of a chemical compound in a first liquid by reacting therewith a reagent which reacts exothermically or endothermically with said compound, comprising a body member having therein a passage; a first conduit for said first liquid connected to a first end of said passage, a second conduit for a second liquid containing said reagent also connected to said first end of said passage, a third conduit leading from a second end of said passage remote from said first end, forcing means for continuously forcing said liquids through said first and second conduits so as to unite the liquids at said first end of said passage, said passage and said first and second conduits and said forcing means being of a capacity such that the liquids continuously unite in said passage in constant ratio by volume and continuously react as they pass through said passage, said passage having a mixing baffle therein to promote thorough mixing of the reactants, three thermistors disposed one in each of said conduits in positions such that they are responsive to the temperatures of said first and second liquids immediately before they unite and to the temperature of the united liquids in said third conduit when said reagent has reacted with said compound, means for substantially preventing heat exchange between the united liquids in said passage and the ambient atmosphere and an electrical system connected to said thermistors to continuously determine the difference in temperature of the united liquids before and after the reaction takes place and give direct readings therefrom of the molar concentration of the chemical compound.

2. Apparatus in accordance with claim 1, the cross sectional areas of said first and second conduits being equal and said means for forcing said liquids through the conduits being such that said liquids unite in equal volumes in said passage.

3. Apparatus for determining the concentration of a chemical compound in a first liquid by reacting with a reagent which reacts exothermically or endothermically with said compound, comprising a cylindrical body of low heat capacity plastic material having a central bore therethrough, a mixng tube within said bore in spaced relation to the walls thereof to form an annular space between the tube and walls of the bore, annular plugs within and at opposite end portions of the annular space to locate the mixing tube and form a barrier against the loss of heat from a stream passing therethrough; a first conduit in communication with a first end of the mixing tube for said first liquid containing said chemical compound; a second conduit also in communication with the first end of the mixing tube for a second liquid containing said reagent; means for forcing said liquids through said conduits so as to unite said liquids at the first end of said mixing tube and then move them through said mixing tube; said conduits, said mixing tube and said forcing means being of a capacity such that the liquids unite in the mixing tube in constant ratio by volume; a third conduit in communication with a second end of said mixing tube remote from said first end and through which the united liquids leave the apparatus; three bores in said body parallel to said central bore and respectively intersecting said three conduits; three thermistors disposed in said three bores each at the intersection thereof with one of said conduits in positions such that they are responsive to the temperature of said first and second liquids immediately before they unite, and to the temperature of the united liquids in said third conduit after said reagent has reacted with said compound; baffle means for creating turbulent flow of the united liquids as they pass through said mixing tube to effect thorough in-line mixing; and an electrical system connected to said thermistors to continuously determine the difference in temperature of the united liquid before and after the reaction takes place and gives direct readings therefrom of the molar concentration of the chemical compound.

References Cited

UNITED STATES PATENTS

| | | | |
|---|---|---|---|
| 1,594,593 | 8/1926 | Boertlein | 23—253 |
| 1,923,865 | 8/1933 | Handforth | 23—162 |
| 3,138,436 | 6/1964 | Harmon | 23—253 |

OTHER REFERENCES

Howard, Henry, Journal of the Society of Chemical Industry, vol. 29, pp. 3–4 (1910).

MORRIS O. WOLK, *Primary Examiner.*

ELLIOTT A. KATZ, *Assistant Examiner.*

U.S. Cl. X.R.

73—190; 324—71